United States Patent
Lin et al.

(10) Patent No.: US 10,490,161 B2
(45) Date of Patent: Nov. 26, 2019

(54) PROJECTION DEVICE AND LUMINANCE CONTROL METHOD OF FRAME THEREOF

(71) Applicants: Ming-Tsun Lin, Hsin-Chu (TW); Hao-Chang Tsao, Hsin-Chu (TW)

(72) Inventors: Ming-Tsun Lin, Hsin-Chu (TW); Hao-Chang Tsao, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 554 days.

(21) Appl. No.: 14/326,475

(22) Filed: Jul. 9, 2014

(65) Prior Publication Data
US 2015/0035868 A1   Feb. 5, 2015

(30) Foreign Application Priority Data
Jul. 31, 2013   (TW) .............................. 102127504 A (51) Int. Cl.
  *G09G 3/34*   (2006.01)
  *G09G 5/10*   (2006.01)
  *H04N 9/31*   (2006.01)
(52) U.S. Cl.
  CPC .............. *G09G 5/10* (2013.01); *G09G 3/3406* (2013.01); *H04N 9/3155* (2013.01); *G09G 2320/0646* (2013.01); *G09G 2360/16* (2013.01)
(58) Field of Classification Search
  None
  See application file for complete search history.

(56) References Cited

U.S. PATENT DOCUMENTS

| | | | |
|---|---|---|---|
| 6,236,466 B1 * | 5/2001 | Chung | H04N 1/4055 358/1.9 |
| 8,232,956 B2 | 7/2012 | Fujine et al. | |
| 2001/0024178 A1 * | 9/2001 | Takeuchi | G09G 3/3406 345/55 |

(Continued)

FOREIGN PATENT DOCUMENTS

| | | |
|---|---|---|
| CN | 101600120 | 12/2009 |
| CN | 1901618 | 12/2010 |

(Continued)

OTHER PUBLICATIONS

"Office Action of Taiwan Counterpart Application", dated Jun. 4, 2015, p. 1-p. 9, in which the listed references were cited.

(Continued)

*Primary Examiner* — Parul H Gupta
(74) *Attorney, Agent, or Firm* — JCIPRNET (57) ABSTRACT

A projection device and a luminance control method of a frame are provided. The luminance control method of the frame includes the following steps. Whether the frame is a dark-like frame or not is determined according to a gray level distribution of the frame and whether at least one sub-frame of the frame is a dark-like sub-frame or not is determined according to a gray level distribution of the sub-frame. When the frame is the dark-like frame and the sub-frame is not the dark-like sub-frame, a corresponding area of the sub-frame is ignored and a reference value of luminance is computed according to a part corresponding to the unignored area in the frame. The luminance of a projection light of the projection device is adjusted according to the reference value of luminance.

14 Claims, 4 Drawing Sheets

(56) References Cited

U.S. PATENT DOCUMENTS

2011/0228174 A1    9/2011  Lai et al.
2013/0044936 A1*   2/2013  Wang ................... G06T 7/0004
                                                        382/141

FOREIGN PATENT DOCUMENTS

| EP | 2541321   | 1/2013  |
| TW | 200842795 | 11/2008 |
| TW | 201104337 | 2/2011  |
| TW | I342155   | 5/2011  |
| TW | 201138547 | 11/2011 |

OTHER PUBLICATIONS

"Office Action of China Counterpart Application", dated Jan. 26, 2017, p. 1-p. 9, in which the listed references were cited.

* cited by examiner

PROJECTION DEVICE AND LUMINANCE CONTROL METHOD OF FRAME THEREOF

CROSS-REFERENCE TO RELATED APPLICATION

This application claims the priority benefit of Taiwan application serial no. 102127504, filed on Jul. 31, 2013. The entirety of the above-mentioned patent application is hereby incorporated by reference herein and made a part of this specification.

BACKGROUND OF THE INVENTION

1. Field of the Invention

The invention generally relates to a projection technology, and also to a projection device and a luminance control method of a projection image thereof.

2. Description of Related Art

Projection devices may project an image onto a large screen to facilitate more people to watch the content displayed on the screen concurrently. Therefore, projection devices are generally used in public places, such as in companies and schools. Further, as large-scale home display products are the trend, projection devices are widely used in general families and also become a common electronic product in people's daily life.

In a display device, the contrast ratio of a frame has a significant impact on the quality of the frame. Therefore, manufacturers work diligently on enhancing the contrast ratio of a projection device. One approach on raising the contrast ratio of a frame is by configuring an aperture mechanism in front of the projection lens of the projection device to control the light emitting quantity. Alternatively, the luminance of the projection light of the projection device is adjusted to enhance the contrast ratio of a frame.

Generally speaking, if a projection device applies a dynamic contrast technique to enhance the dynamic contrast, the power of the projection light source is adjusted according to the different degrees of light field and dark field. However, limited by global image detection, when a light spot or a brighter object appears in an image, even the background of the image is completely black, the luminance of the light source is raised due to the appearance of the light spot and the brighter object. Ultimately, the color purity of the black background is unable to be maintained by reducing the luminance of the light source.

The U.S. Pat. No. 8,232,956 discloses a displayable video with a display definition, wherein the display definition is applicable to the type of the video content to be displayed. The liquid crystal display device controls the luminance of the backlight light source according to the average picture level (APL) measured by an APL measuring portion. When the liquid crystal device is executing the on-screen display (OSD), the range of APL of the measured video signal is determined by the luminance level of the video signal or the genre information included in the inputted video signal or the OSD display information. The upper and the lower non-video areas are deleted and an effective video area is determined. Accordingly, the additional information is displayed when the video signal belongs to a specific genre and the additional information displayed by OSD is excluded. Further, the luminance of the backlight light source is controlled to achieve a display definition suitable for the video signal.

Taiwan patent number 1342155 discloses methods for processing image signals, method displaying image signals, and related devices. The proposed method includes performing a predetermined detection on an image signal; partitioning a frame corresponding to the image signal into a plurality of image areas, wherein each image area includes a plurality of pixels; respectively computing statistic data for each of the plurality of areas according to the results of the predetermined detection to obtain a plurality of statistic data corresponding to the plurality of image areas.

SUMMARY OF THE INVENTION

The invention is directed to a projection device and a luminance control method of a frame in which the color purity of the black background is maintained.

Other objects and advantages of the invention may be further illustrated by the technical features broadly embodied and disclosed as follows.

An embodiment of the application provides a projection device including a frame determination unit, a luminance control unit, a light source module, and a light source driver unit. The frame determination unit receives a frame signal for analysing the gray level distribution of a frame and the gray level distribution of at least one sub-frame, and further determines whether the frame is a dark-like frame according to the gray level distribution of the frame and whether the sub-frame is a dark-like sub-frame according to the gray level distribution of the sub-frame. When the frame is a dark-like frame, and the sub-frame is not a dark-like sub-frame, the frame determination unit ignores the area corresponding to the sub-frame on the frame and computes a luminance reference value according to the part corresponding to the unignored area in the frame. The luminance control unit is coupled with the frame determination unit and provides a luminance control signal based on the luminance reference value. The light source module provides a projection light. The light source driver unit is coupled to the light source module and the luminance control unit for receiving the luminance control signal from the luminance control unit and to set the luminance of the projection light of the light source module based on the luminance control signal.

An embodiment of the application provides a luminance control method of a frame of a projection device, and the method includes at least the following steps. Whether the frame is a dark-like frame is determined according to the gray level distribution of the frame and whether a sub-frame is a dark-like sub-frame is determined according to the gray level distribution of at least one sub-frame. When the frame is the dark-like frame and the sub-frame is not the dark-like sub-frame, the area corresponding to the sub-frame on the frame is ignored and a luminance reference value is computed based on the corresponding unignored area in the frame. The luminance of the projection light is adjusted according to the luminance reference value.

According to the projection device and the luminance control method of the frame thereof of the embodiments of the application, whether the current frame is a dark-like frame is determined according to the gray level distribution of the current frame and whether the sub-frame of the current frame is a dark-like sub-frame is determined according to the gray level distribution of the current sub-frame. When the frame is a dark-like frame and the sub-frame of the frame is a non-dark-like frame, the luminance reference value is calculated and the area corresponding to the sub-frame on the frame is ignored. Hence, the color purity of a black pixel in a frame affected by a bright spot in the frame or a brighter object may be avoided to maintain the color purity of a black background.

Other objectives, features and advantages of the present invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
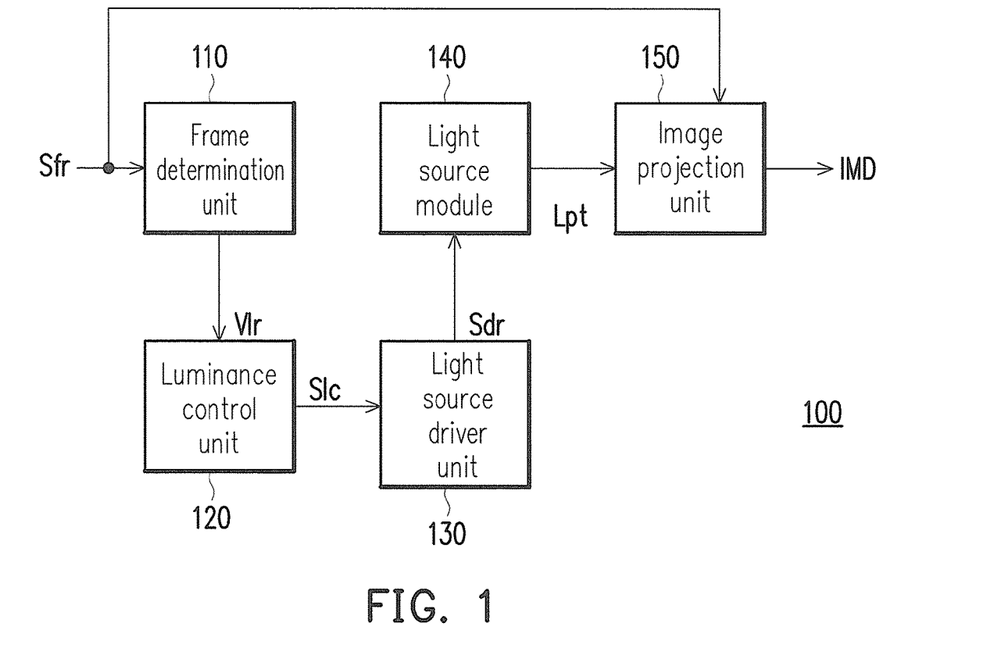
FIG. 1 is a block diagram of a projection device of an embodiment of the application.

Referring to FIG. 1, in this embodiment, the projection device 100 includes a frame determination unit 110, a luminance control unit 120, a light source driver unit 130, light source module 140, and an image projection unit 150. The light source module 140 includes at least one light emitting device for providing a projection light Lpt to the image projection unit 150. The light emitting device may include, but not limited to, high pressure mercury lamp, light emitting diode or laser diode. Further, the projection device 100 adjusts the luminance of the projection light Lpt provided by the light source module 140 via a dynamic contrast method to cause the projection image to have a better image quality.

When the image projection unit 150 receives the projection light Lpt, the image projection unit 150 projects a displayed image IMD by using the projection light Lpt, wherein the displayed image IMD is determined by the frame signal Sfr received by the image projection unit 150.

The frame determination unit 110 receives the frame signal Sfr, and analyses the gray level distribution of the current frame and the gray level distribution of at least one sub-frame in the current frame according to the data transmitted by the frame signal Sfr. Then, the frame determination unit 110 determines whether the current frame is a dark-like frame according to the gray level distribution of the current frame, and determines whether the sub-frame is a dark-like sub-frame according to the gray level distribution of at least one sub-frame in the current frame, wherein the frame includes a plurality of pixels. If the gray level values are defined as 0 to 255, the gray level value being 0 is black and the gray level value being 255 is white. The degree between black and white of each pixel is determined according to the above definitions to obtain a gray level distribution of the frame and a gray level distribution of the sub-frame.

When a frame is a dark-like frame and the sub-frame of the frame is not a dark-like frame, the frame determination unit 110 ignores the corresponding area corresponding to the sub-frame in the frame and computes/calculates a luminance reference value Vlr according to the part conesponding to the unignored area in the current frame. When the frame is a dark-like frame and the sub-frame of the frame is a dark-like sub-frame, the frame determination unit 110 computes/calculates the luminance reference value Vlr according to the entire current frame. When the frame is not a dark-like frame, the frame determination unit 110 computes/calculates the luminance reference value Vlr according to the entire current frame. The luminance control unit 120 is coupled to the frame determination unit 110, and provides a luminance control signal Slc according to the luminance reference value Vlr. The light source driver unit 130 couples the light source module 140 and the luminance control unit 120, is configured to receive the luminance control signal Slc from the luminance control unit 120 and to provide a luminance driving signal Sdr to the light source module 140 according to the luminance control signal Slc so as to set the brightness/luminance of the projection light Lpt of the light source module. The luminance control signal Slc includes the targeted luminance value used for adjusting the projection light Lpt of the light source module 140 to achieve the targeted brightness/luminance, and the luminance driving signal Sdr may be a pulse width modulation signal, which should however not be a limitation to the invention.

Accordingly, when the current frame is a dark-like frame, the frame determination unit 110 may ignore the corresponding area of the non-dark-like sub-frame on the frame to avoid affecting the color purity of a black pixel caused by a bright spot in the frame or an image of a brighter object.

In one embodiment of the application, the frame determination unit 110 counts the number/amount of black pixels displayed in the part of the frame (may be the entirety or a portion of the current frame) corresponding to the unignored area as the luminance reference value Vlr. Moreover, when the luminance reference value Vlr is greater than or equal to a pre-set control threshold value, the current frame may be viewed as a dark-like frame, and the luminance control unit 120 may set the luminance control signal Slc corresponding to the minimum luminance of the projection light Lpt (it is not implied that the projection light Lpt is turned off). When the luminance reference value Vlr is smaller than the control threshold value, the current frame may be viewed as a non-dark-like frame, and the luminance control unit 120 sets the luminance control signal Slc according to the entire current frame; for example, the luminance control unit 120 may set the luminance control signal Slc according to the average value of the gray levels of the part of current frame corresponding to the unignored area.

The above-mentioned pre-set control threshold value may be a product of the number/amount of pixels of the part of the current frame corresponding to the unignored area and a ratio (for example, 0.2). Further, the corresponding gray level value of the above-mentioned black pixel may be the lowest gray level value (such as, gray level value 0) or a lower portion in the gray level range (such as, 0 to 32 in the gray level range of 0 to 255), which should however not be a limitation to the invention.

Figure 2A:
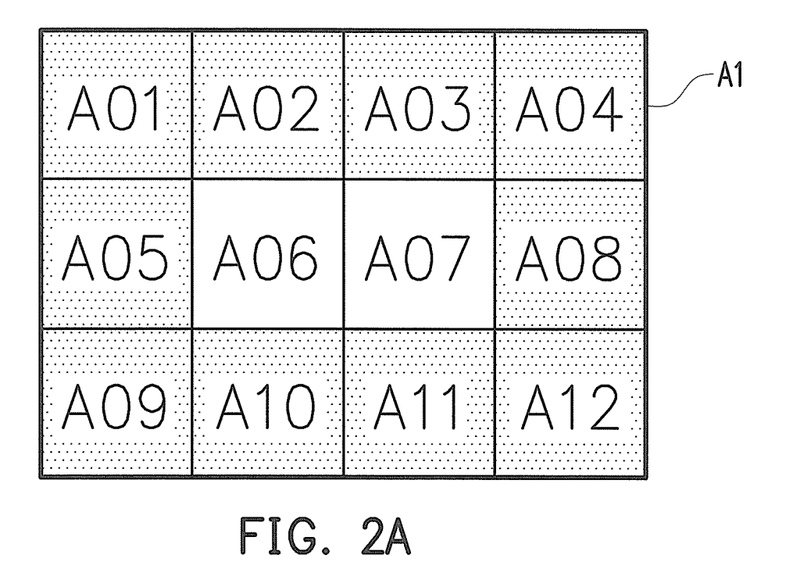
FIGS. 2A and 2B are diagrams of image detection according to an embodiment of the application.
Figure 2B:
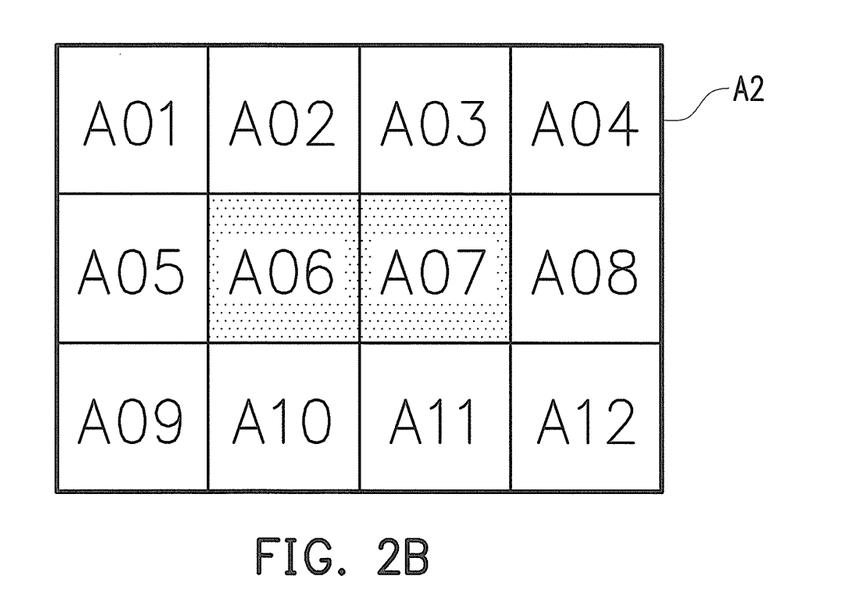

Referring to FIGS. 1, 2A and 2B, in the embodiment, the frame determination unit 110 partitions the current frame, such as the frame A1 in FIG. 2A or the frame corresponding to the frame A2 in FIG. 2B, into a plurality of first sub-frames having substantially similar areas. Further, each first sub-frame includes a plurality of pixels, and the first sub-frames respectively have corresponding areas A01 to A12 on the frame; and whether each of the above-mentioned first sub-frames is a dark-like sub-frame is determined in order to determine whether the current frame is a dark-like frame.

In the embodiment, the frame determination unit 110 counts the number/amount of black pixels displayed in each sub-frame as a determination reference value corresponding to each first sub-frame. When the corresponding determination reference value of the first sub-frame is greater than or equal to a black sub-frame threshold value, the frame determination unit 110 determines the first sub-frame as a dark-like sub-frame, for example, the corresponding dark-like sub-frames of the areas A01 to A05 and A08 to A12 as shown in FIG. 2A. When the corresponding determination reference value of the first sub-frame is smaller/less than the black sub-frame threshold value, the first sub-frame is determined as a non-dark-like sub-frame by the frame determination unit 110, for example, the corresponding non-dark-like sub-frames of the areas A06 to A07 as shown in FIG. 2A. The frame determination unit 110 sequentially counts and determine whether each first sub-frame is a dark-like sub-frame and the determination reference value may be the number/amount of black pixels in each first sub-frame, and the black sub-frame threshold value is a product of the number/amount of pixels in each sub-frame and a ratio (for example, 0.2).

Moreover, the frame determination unit 110 may count the number/amount of dark-like sub-frames in the first sub-frames as a frame determination reference value; for example, the frame determination reference value is 10 in FIG. 2A (the corresponding areas A01 to A05 and A08 to A12 with a dotted shading as shown in FIG. 2A). When the frame determination reference value is greater than or equal to a black-frame threshold value (for example, 4, i.e., 12×0.33), the frame determination unit 110 determines the current frame as a dark-like frame (as shown in FIG. 2A). When the frame determination reference value is smaller than a black-frame threshold value, the frame determination unit 110 determines the current frame as a non-dark-like frame (as shown in FIG. 2B). Wherein a black-frame threshold value is a product of the number/amount of the first sub-frames in the current frame and a ratio (such as 0.33).

In the embodiment of FIG. 2A, the current frame is determined as a dark-like frame; therefore, the corresponding areas A06 and A07 of the non-dark-like sub-frames on the frame are ignored. Alternatively speaking, the frame determination unit 110 computes/calculates the luminance reference value Vlr only based on the areas A01 to A05 and A08 to A12 corresponding to the unignored sub-frames on the frame. In the embodiment of FIG. 2B, the current frame is determined as a non-dark-like frame, hence no area is ignored. Alternatively speaking, the frame determination unit 110 computes/calculates the luminance reference value Vlr according to the areas A01 to A12 corresponding to all the sub-frames on the current frame A2.

Referring to FIGS. 1, 3A to 3F, in the embodiment, the frame determination unit 110 selects portions of the current frame A3 as sub-frames; for example, the specific areas A31 to A36 correspond to the sub-frames in frame A3. Further, the frame determination unit 110 counts the number/amount of black pixels displayed in the current frame as a frame distribution reference value and counts the number/amount of black pixels displayed in the sub-frame as a sub-frame distribution reference value. Then, the sub-frame distribution reference value is subtracted from the frame distribution reference value to obtain a frame determination reference value. When the frame determination reference value is greater than or equal to the black-frame threshold value, the frame determination unit 110 determines the frame A3 as a dark-like frame. When the frame determination reference value is smaller than the black-frame threshold value, the frame determination unit 110 determines the frame A3 as a non-dark-like frame. Wherein, the black-frame threshold value is a product of the number/amount of pixels in the current frame (i.e., the frame resolution) and a ratio.

Figure 3A:
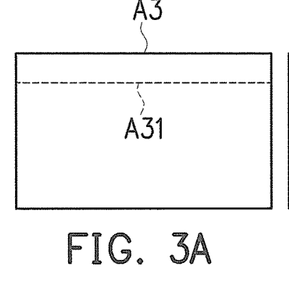
FIGS. 3A to 3G are diagrams of image detection according to another embodiment of the application.
Figure 3B:
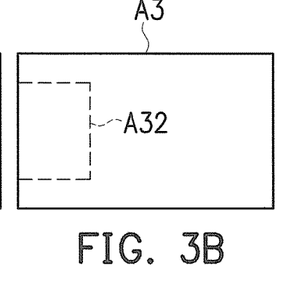
Figure 3C:
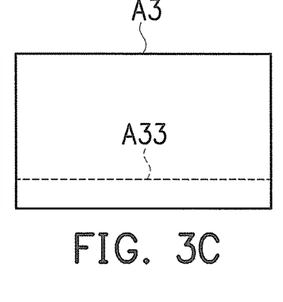
Figure 3D:
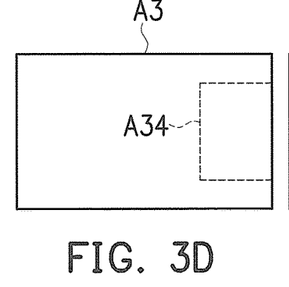
Figure 3E:
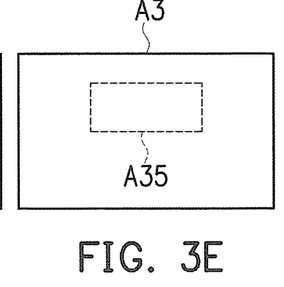
Figure 3F:
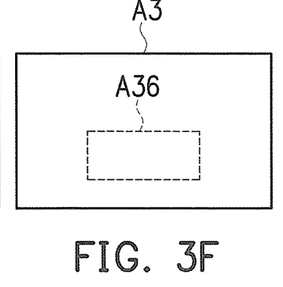
Figure 3G:
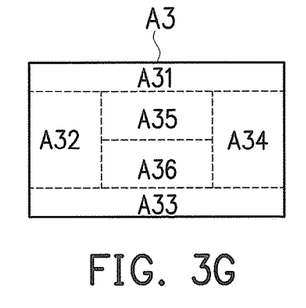

In the embodiment, the sub-frames selected by the frame determination unit 110 at different time points may correspond to specific areas at different positions on frame A3. As shown in FIGS. 3A to 3F, the frame determination unit 110 may select, according to the time sequence, the top part of the current frame A3 as a sub-frame (e.g., the corresponding specific area A31), the left part of the current frame A3 as a sub-frame (e.g., the corresponding specific area A32), the bottom part of the current frame A3 as a sub-frame (e.g., the corresponding specific area A33), the right part of the current frame A3 as a sub-frame (e.g., the corresponding specific area A34), the part above the center of the current frame A3 as a sub-frame (e.g., the corresponding specific area A35), the part below the center of the current frame A3 as a sub-frame (e.g., the corresponding specific area A36). Moreover, as shown in FIG. 3G, the current frame A3 overlaps with the specific areas A31 to A36 and the specific areas A31 to A36 do not overlap with each other. In other embodiments, the specific areas A31 to A36 may overlap with each other and the sizes of the specific areas A31 to A36 may be different. Although the disclosure herein refers to certain illustrated embodiments of specific areas in FIGS. 3A to 3G, it is to be understood that the dimensions of the specific areas A31 to A36 may be adjusted and the embodiments are presented not by way of limitation.

In one embodiment of the application, the frame determination unit 110 may periodically execute one complete frame determination, and within one frame determination period, the frame determination unit 110 may sequentially determine whether it is a dark-like frame after the sub-frame distribution reference value (such as the number/amount of the black pixels of the sub-frame) of the sub-frame corresponding to the specific areas A31 to A36 is subtracted from the frame distribution reference value of the current frame (such as the number/amount of black pixels of the frame), and determine whether the sub-frame corresponding to the one of the specific areas A31 to A36 is ignored. In other embodiments, the frame determination unit 110, during one frame determination period, determines for one time whether one of the specific areas A31 to A36 is ignored. In other embodiments, the user oneself may designate/indicate/specify the determined specific area (such as A31 to A36). It is to be understood that embodiments are presented not by way of limitation.

Figure 4:
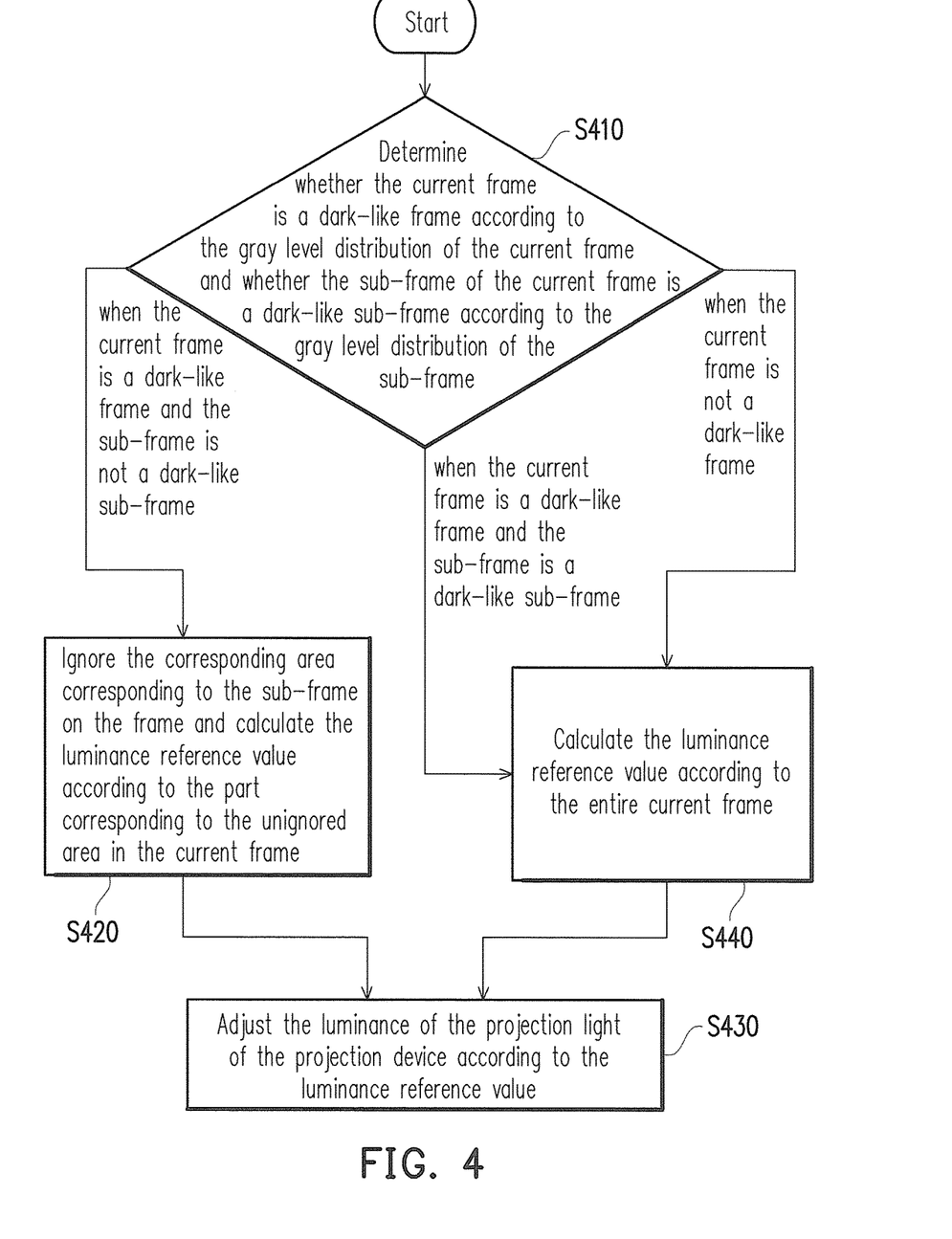
FIG. 4 is flow diagram of steps of luminance control method of a projection image of a projection device according to an embodiment of the application.

Referring to FIG. 4, in this embodiment, the luminance control method of a projection image by a projection device includes following steps. Firstly, whether the current frame is a dark-like frame is determined according to the gray level distribution of the current frame, and whether the sub-frame of the current frame is a dark-like sub-frame is determined according to the gray level distribution of the sub-frame (step S410). When the current frame is a dark-like frame and the sub-frame is a non-dark-like sub-frame, the corresponding area corresponding to the sub-frame on the frame is ignored and the luminance reference value is calculated/computed based on the part corresponding to the unignored area in the current frame (step S420). Thereafter, the luminance of the projection light of the projection device is adjusted according to the luminance reference value (Step S430).

On the other hand, when the current frame is a dark-like frame and the sub-frame is a dark-like sub-frame or the current frame is not a dark-like frame, the luminance reference value is calculated/computed based on the entire current frame (Step S440), and the luminance of the projection light of the projection device is further adjusted based on the luminance reference value (Step S430). The process steps S410, S420, S430, and S440 described in above order is solely for the illustration and should not be regard as limiting. Further, the details of the above process steps S410, S420, S430, and S440 may refer to embodiments illustrated in FIGS. 1, 2A, 2B, 3A to 3G and therefore are not further reiterated herein.

According to the projection device and luminance control method thereof of the embodiments of the application, whether the current frame is a dark-like frame is determined according to gray level distribution of the current frame and whether the sub-frame of the current frame is a dark-like sub-frame is determined according to the gray level distribution of the sub-frame. When the current frame is a dark-like frame and the sub-frame of the current frame is a non-dark-like sub-frame, the area corresponding to the sub-frame on the frame is ignored. Hence, the color purity of a black pixel in a frame affected by a bright spot in the frame or a brighter object may be obviated to maintain the color purity of a black background.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
   a frame determination calculator adapted to receive a frame signal for determining a displayed image and analyze a frame gray level distribution of a frame and a sub-frame gray level distribution of at least one sub-frame of the frame using the frame signal, adapted to determine whether the frame is a dark-like frame according to the frame gray level distribution and to determine whether the at least one sub-frame is a dark-like sub-frame according to the sub-frame gray level distribution, wherein when the frame is determined to be the dark-like frame and the at least one sub-frame is determined to be a non-dark-like sub-frame, the frame determination calculator is configured to ignore an area corresponding to the at least one sub-frame on the frame for calculating a luminance reference value based on a part corresponding to an unignored area in the frame, wherein the ignored area corresponding to the at least one sub-frame is smaller than the unignored area in the frame;
   a luminance controller, coupled to the frame determination calculator, adapted to provide a luminance control signal according to the luminance reference value, wherein when the frame is determined to be the dark-like frame and the at least one sub-frame is determined to be the non-dark-like sub-frame, the luminance controller is configured to set the luminance control signal corresponding to a minimum luminance of a projection light based on the luminance reference value;
   at least one light emitter adapted to provide the projection light; and a light source driver, coupled to the at least one light emitter and the luminance controller, adapted to receive the luminance control signal from the luminance controller, and adapted to set a luminance of the projection light of the at least one light emitter according to the luminance control signal.

2. The projection device according to claim 1, wherein the frame determination calculator is configured to partition the frame into a plurality of first sub-frames, and each of the first sub-frames corresponds to a plurality of areas, and determines whether each of the first sub-frames is the dark-like sub-frame to determine whether the frame is the dark-like frame.

3. The projection device according to claim 2, wherein the frame comprises a plurality of pixels, and the frame determination calculator is adapted to count an amount of black pixels displayed in the each first sub-frame to serve as a determination reference value corresponding to the each first sub-frame, and when the determination reference value corresponding to the each first sub-frame is greater than or equal to a black sub-frame threshold value, the frame determination calculator is adapted to determine the each first sub-frame as the dark-like sub-frame, and when the determination reference value corresponding to the each first sub-frame is smaller than the black sub-frame threshold value, the frame determination calculator is adapted to determine the each first sub-frame as the non-dark-like sub-frame, wherein the black sub-frame threshold value is a product of an amount of the pixels in the each first sub-frame and a ratio.

4. The projection device according to claim 2, wherein the frame determination calculator is adapted to count an amount of the dark-like sub-frames in the first sub-frames as a frame determination reference value, and when the frame determination reference value is greater than or equal to a black-frame threshold value, the frame determination calculator is adapted to determine the frame as the dark-like frame, and when the frame determination reference value is smaller than the black-frame threshold value, the frame determination calculator is adapted to determine the frame as the non-dark-like frame, wherein the black-frame threshold value is a product of an amount of the first sub-frames and a ratio.

5. The projection device according to claim 1, wherein the frame determination calculator is adapted to count an amount of black pixels displayed in the frame as a frame distribution reference value and the amount of the black pixels displayed in the sub-frame as a sub-frame distribution reference value, and a frame determination reference value is obtained by subtracting the sub-frame distribution reference value from the frame distribution reference value, and when the frame determination reference value is greater than or equal to a black-frame threshold value, the frame determination calculator is adapted to determine the frame as the dark-like frame, and when the frame determination reference value is smaller than the black-frame threshold value, the frame determination calculator is adapted to determine the frame as the non-dark-like frame, wherein the black-frame threshold value is a product of an amount of pixels in the frame and a ratio.

6. The projection device according to claim 5, wherein during a frame determination period, the sub-frame corresponds to a plurality of specific areas at different positions of the frame and corresponds to one of the specific areas according to a time sequence, and the frame respectively overlaps with the specific areas.

7. The projection device according to claim 1, wherein the frame determination calculator is adapted to count an amount of black pixels displayed in the part corresponding to the unignored area in the frame as the luminance reference value.

8. A luminance control method of a frame, the method comprising:
   analyzing a frame gray level distribution of the frame and a sub-frame gray level distribution of at least one sub-frame of the frame using a frame signal, wherein the frame signal determines a displayed image;
   determining whether the frame is a dark-like frame according to the frame gray level distribution, and determining whether the at least one sub-frame of the frame is a dark-like sub-frame according to the sub-frame gray level distribution;
   when the frame is determined to be the dark-like frame and the at least one sub-frame is determined to be a non-dark-like sub-frame, ignoring an area corresponding to the at least one sub-frame on the frame for calculating a luminance reference value according to a part corresponding to an unignored area in the frame, wherein the ignored area corresponding to the at least one sub-frame is smaller than the unignored area in the frame;
   adjusting a luminance of a projection light of a projection device according to the luminance reference value; and
   setting the luminance of the projection light as a minimum luminance when the frame is determined to be the dark-like frame and the at least one sub-frame is determined to be the non-dark-like sub-frame.

9. The luminance control method of claim 8, wherein the step of determining whether the frame is the dark-like frame according to the frame gray level distribution comprises:
   partitioning the frame into a plurality of first sub-frames, and the each first sub-frame respectively corresponds to a plurality of corresponding areas; and
   determining whether the each first sub-frame is the dark-like sub-frame to determine whether the frame is the dark-like frame.

10. The luminance control method according to claim 9, wherein the step of determining whether the each first sub-frame is the dark-like sub-frame comprises:
    counting an amount of black pixels displayed in the each first sub-frame as a sub-frame determination reference value;
    when the sub-frame determination reference value corresponding to the each first sub-frame is greater than or equal to a black sub-frame threshold value, determining the each first sub-frame is the dark-like sub-frame; and
    when the sub-frame determination reference value corresponding to the each first sub-frame is smaller than the black sub-frame threshold value, determining the each first sub-frame is the non-dark-like sub-frame, wherein the black sub-frame threshold value is a product of an amount of pixels in the each first sub-frame and a ratio.

11. The luminance control method according to claim 9, wherein the step of determining whether the frame is the dark-like frame comprises:
    counting an amount of the dark-like sub-frames in the first sub-frames as a frame determination reference value;
    when the frame determination reference value is greater than or equal to a black-frame threshold value, determining the frame as the dark-like frame; and
    when the frame determination reference value is smaller than the black-frame threshold value, determining the frame as the non-dark-like frame, wherein the black-frame threshold value is a product of an amount of the first sub-frames and a ratio.

12. The luminance control method according to claim 8, wherein the steps of determining whether the frame is the dark-like frame according to the frame gray level distribution and determining whether the at least one sub-frame of the frame is the dark-like sub-frame according to the sub-frame gray level distribution comprise:
    counting an amount of black pixels displayed in the frame as a frame distribution reference value;
    counting the amount of the black pixels displayed in the sub-frame as a sub-frame distribution reference value;
    obtaining a frame determination reference value by subtracting the sub-frame distribution reference value from the frame distribution reference value;
    when the frame determination reference value is greater than or equal to a black-frame threshold value, determining the frame as the dark-like frame; and
    when the frame determination reference value is smaller than the black-frame threshold value, determining the frame as the non-dark-like frame, wherein the black-frame threshold value is a product of an amount of pixels in the frame and a ratio.

13. The luminance control method according to claim 12, wherein during a frame determination period, the at least one sub-frame corresponds to a plurality of specific areas at different positions in the frame and corresponds to one of the specific areas according to a time sequence, and the frame respectively overlaps with the specific areas.

14. The luminance control method according to claim 8, wherein the step of calculating the luminance reference value according to the part corresponding to the unignored area in the frame comprises:
    counting an amount of black pixels displayed in the part corresponding to the unignored area in the frame as the luminance reference value.

\* \* \* \* \*